United States Patent [19]

Guadagno

[11] Patent Number: 4,862,809
[45] Date of Patent: Sep. 5, 1989

[54] SUPPORTS FOR RAILWAY LINEAR SYNCHRONOUS MOTOR

[75] Inventor: James R. Guadagno, Denver, Colo.

[73] Assignee: Cimarron Technology Ltd., Paonia, Colo.

[21] Appl. No.: 115,699

[22] Filed: Nov. 2, 1987

Related U.S. Application Data

[60] Division of Ser. No. 835,974, Mar. 4, 1986, abandoned, which is a continuation-in-part of Ser. No. 513,009, Jul. 12, 1983, abandoned.

[51] Int. Cl.[4] ............................................. B62L 13/00
[52] U.S. Cl. .................................... 104/292; 104/293
[58] Field of Search .................. 105/26.05, 34.1, 49, 105/133, 137, 138, 141, 148, 155, 157.1, 164; 104/290-294

[56] References Cited

U.S. PATENT DOCUMENTS

| | | | |
|---|---|---|---|
| 506,770 | 10/1893 | Cranston | 105/155 X |
| 3,548,751 | 12/1970 | Bykov et al. | 105/49 X |
| 3,807,313 | 4/1974 | Koyanagi | 104/291 |
| 3,845,721 | 11/1974 | Wagner | 104/290 X |
| 4,307,668 | 12/1981 | Vinson | 105/164 X |
| 4,440,092 | 4/1984 | Sobolewski | 105/49 X |

Primary Examiner—Robert B. Reeves
Assistant Examiner—Gary C. Hoge
Attorney, Agent, or Firm—Christie, Parker & Hale

[57] ABSTRACT

The fixed magnetic structure of a linear synchronous motor for a railway system is supported above the tracks by steel ribs so that thermal expansion of the ribs is similar to expansion of steel vehicles on the railway. The moving parts of the linear synchronous motor are mounted on the vehicle so as to follow the fixed parts closely for optimum coupling of force between the fixed and moving parts.

13 Claims, 3 Drawing Sheets

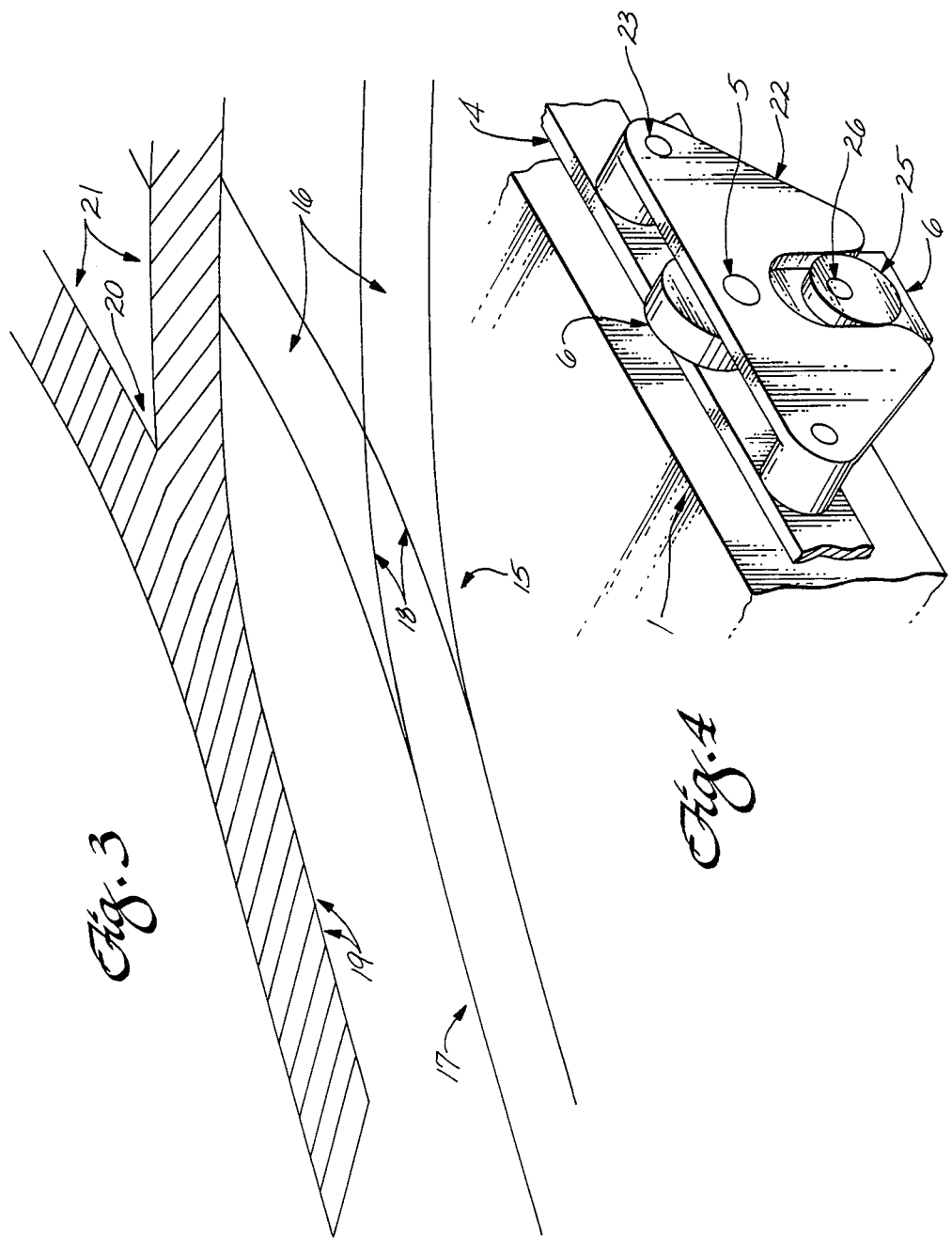

SUPPORTS FOR RAILWAY LINEAR SYNCHRONOUS MOTOR

This application is a division and continuation-in-part of application Ser. No. 835,974, filed Mar. 4, 1986, now abandoned which was in turn a continuation-in-part of application Ser. No. 513,009, filed Jul. 12, 1983, also abandoned. The subject matter of these earlier applications is hereby incorporated by reference.

BACKGROUND OF THE INVENTION

1. Field of the Invention

This invention relates to a number of interrelated improvements for a railway system which employs a linear synchronous motor as its means of propulsion. More specifically, it relates to improved means for controlling the air gap between the moving and stationary motor parts of the linear synchronous motor by controlling the relationship between the moving motor parts of the motor and the wheels supporting the railway cars using the railway system, and also by controlling the relationship between the stationary motor parts of the linear synchronous motor and the rails upon which the wheels of the railway cars ride. It also relates to a means for controlling the air gap between the moving and stationary motor parts of the linear synchronous motor at switching points on the railway system by controlling the angular orientation of the moving motor parts of the linear synchronous motor relative to the wheels of the railway cars upon which these moving motor parts are mounted. This angular orientation through a switching point is designed to match the angular orientation of the stationary motor parts of the linear synchronous motor relative to the rails upon which the railway car rides through a switching point regardless of the direction taken by the railway car at the switching point.

2. Description of the Prior Art

Linear synchronous motors offer a number of important advantages with regard to their use as propulsion systems for ground transportation systems. They can be operated at extremely high speeds, with the limit generally being dictated by the method of supporting the vehicles on the track, rather than by the capabilities of the motors themselves; they are extremely efficient motors, offering great savings in fuel consumption; and they are capable of operation at constant speeds of travel which are determined solely by the frequency of the applied alternating current, thus offering potential for absolute vehicle speed control and consequent extremely high traffic capacities.

Utilization of the high efficiency offered by linear synchronous motors depends on the maintenance of a narrow air gap between the moving and stationary motor parts of the motors. At high speeds of travel, vehicles are subject to increased probabilities of deviation from a constant plane of orientation, due to increased dynamic forces. Thus, it is very important that all geometric factors affecting the relative positions of the moving and stationary motor parts be carefully controlled. If we take as an example a railway system employing railway cars mounted on wheels running on rails, and powered by an overhead linear synchronous motor, then it becomes critical for the maintenance of a small and relatively constant air gap between the moving and stationary parts of that motor, that both the vertical distance between the bottoms of the railway car wheels and the tops of the moving motor parts, and the vertical distance between the tops of the rails and the bottoms of the stationary motor parts be controlled within strict limits.

SUMMARY OF THE INVENTION

The present invention, in its preferred embodiment, provides a means for controlling the vertical distance between the wheels of a railway car riding on a railway system and the moving motor parts of a linear synchronous motor mounted on the top of the railway car. This is accomplished by means of a direct connection between the moving motor parts and the trucks upon which the wheels of the railway car are mounted, which allows the moving motor parts to maintain a substantially constant vertical height above the wheels regardless of any change in the orientation of the wheels as they follow the curves of the railway track.

The present invention also provides a means for controlling the vertical distance between the rails upon which the railway car runs and the stationary motor parts of the linear synchronous motor mounted above the rails. This is accomplished by means of direct connections between the rails and the stationary motor parts which are independent of the structure supporting the rails and the stationary motor parts. The preferred embodiment also allows for differential thermal expansion between the rails and the stationary motor parts on the one hand, and the supporting structure on the other.

The present invention further provides a means for controlling the vertical distance between the railway car wheels and the moving motor parts while the railway car is passing through a switching point on the railway system, in such a way that a substantially constant air gap is maintained between the moving motor parts and the stationary motor parts mounted on the track, regardless of the direction of travel taken by the railway car at the switching point.

It is, therefore, an object of this invention to provide means by which the air gap between the moving and stationary motor parts of a linear synchronous motor used to propel a railway car on a railway system can be maintained at a small and substantially constant value regardless of any changes in orientation of the track of the railway system encountered by the railway car.

Another object is to provide means by which the air gap can be maintained at a small and substantially constant value as the railway car proceeds through a switching point on the railway system, regardless of the direction of travel taken by the railway car at the switching point.

These and other objects of the present invention will become apparent to those skilled in the art from the following detailed description, showing the novel construction, combination, and arrangement of parts as herein described, and more particularly defined by the appended claims, it being understood that changes in the precise embodiments of the herein disclosed invention are meant to be included as come within the scope of the claims, except insofar as precluded by the prior art.

BRIEF DESCRIPTION OF THE DRAWINGS

The preferred embodiment of the present invention is illustrated in the accompanying drawings, in which:

FIG. 3 shows schematically the orientation of the stationary motor parts of a linear synchronous motor relative to the rails of a railway system at a switching point;

FIG. 4 is a fragmentary isometric view of a mechanism for controlling the orientation of the moving motor parts of a linear synchronous motor through a switching point.

DETAILED DESCRIPTION OF THE INVENTION

Figure 1:
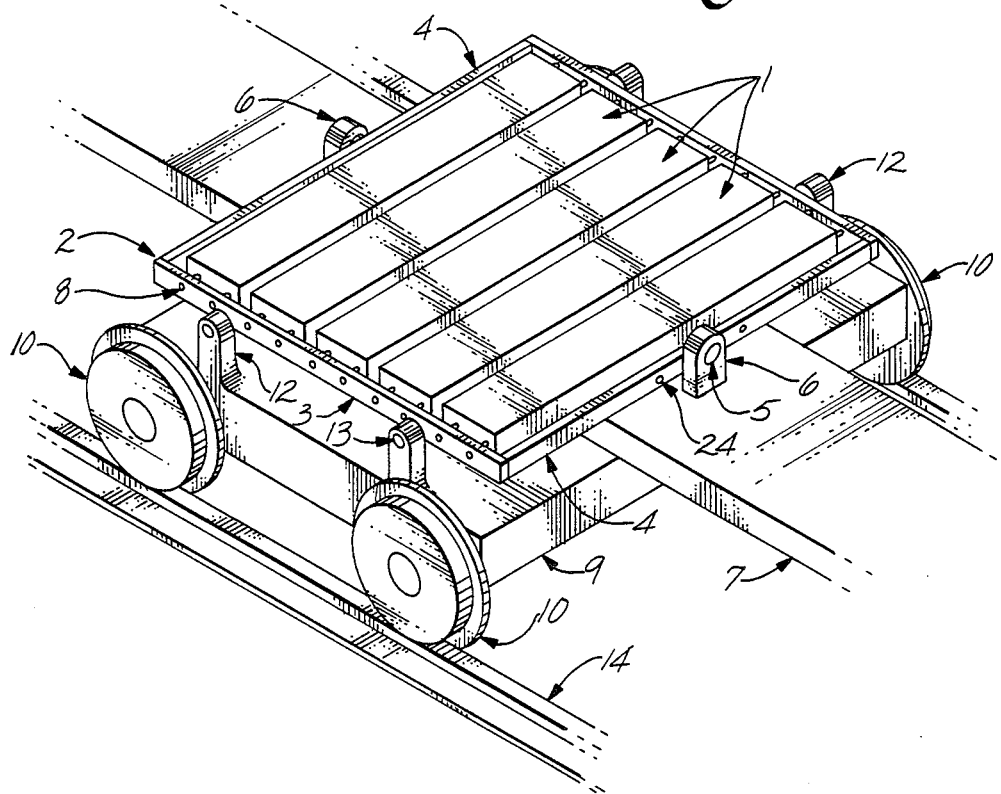
FIG. 1 is an isometric view of the mechanism through which the moving motor parts of a linear synchronous motor are connected to the wheel trucks of a railway car.

One embodiment of the mechanism through which the moving motor parts of a linear synchronous motor mounted on a railway car are connected to the trucks supporting the wheels of the railway car is shown in FIG. 1. This particular embodiment relates to a railway system where the stationary motor parts of the linear synchronous motor are located overhead and the wheel trucks of the railway cars are located immediately beneath the linear synchronous motor. Such a geometry would be found, for instance, on an overhead-suspended railway system where the load carried by the railway car is suspended beneath the carriage of the railway car. Other configurations could easily employ the same general design, with various modifications being made to conform to the particular geometry involved.

In this preferred embodiment, the moving motor parts 1 of the linear synchronous motor are contained within and supported by a surrounding framework 2 comprising longitudinal members 3 attached at their ends to transverse members 4. Primary support for the framework and moving motor parts is provided by means of shafts 5 supported through suitable bearings by supports 6 which are mounted on the frame 7 of the railway car. Thrust provided by the linear synchronous motor is also transmitted from the moving motor parts through the framework 2, shafts 5, and supports 6 to the frame of the railway car.

Figure 2:
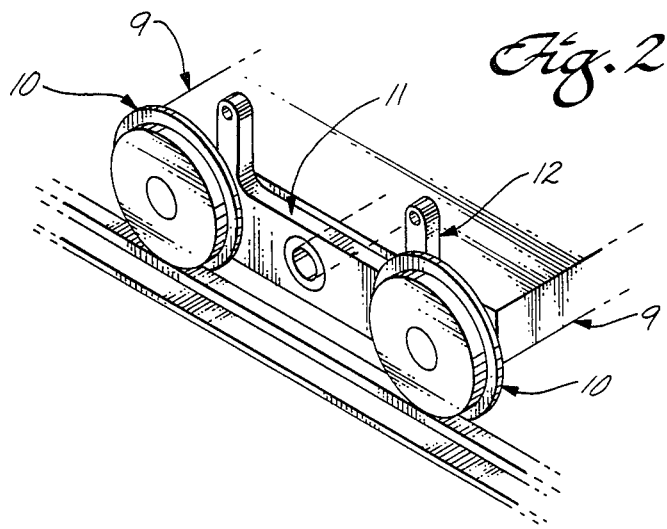
FIG. 2 is a partial view of an alternative mechanism designed for railway car suspension systems wherein pairs of wheels are free to rotate about the transverse axis of the wheel trucks.

Each moving motor part is attached to both longitudinal members 3 by means of one or more connectors 8 whose design depends on the design of the suspension system of the railway car. For example, most railway cars employ wheel trucks 9 which are attached to the frame by means of pivots about the vertical axis, which permit each truck to follow the curvature of the rails of the railway system independently of each other. In such a case, the connectors 8 can be rigid. In instances where wheels 10 are mounted in pairs on the trucks through yokes 11, as shown in FIG. 2, in such a way that each pair of wheels on one side of a truck are also pivotally connected so that they can rotate about a transverse axis in order to conform better to changes in track curvature and superelevation, then the connectors would have to be capable of limited flexibility. In such a case, the longitudinal members of the framework would also be attached to the transverse members by means of flexible connectors.

During travel on normal sections of track, the framework is attached to supports 12 mounted on the truck by means of detachable connectors 13, which could consist of, for example, solenoid-powered detents fitting into sockets in the longitudinal members. This connection serves to orient the moving motor parts about the longitudinal rotational axis provided by the shafts 5 and supports 6 in such a way that the top working surface of the moving motor parts is always coplanar with the plane formed by the bottom running surfaces of the wheels, and therefore by rails 14 of the railway system. This orientation control is maintained even if the truck design permits pairs of wheels to rotate about the transverse axis of truck.

In an alternative design (not shown), the transverse members are eliminated and shafts are connected directly to the moving motor parts located at the ends of each of a group of moving motor parts. Thrust from the intermediate moving motor parts is then transferred through longitudinal members to these end motor parts and thence to the railway car through the shafts, supports, and frame.

If the tracks of the railway system are banked at a switching point in order that the switch can be negotiated at higher speeds, if a continuous supply of power is to be provided to a railway car passing through the switching point regardless of the direction of travel taken by the railway car, and if the railway cars turning in different directions at the switching point are to be supplied with power from the same stationary motor parts of the linear synchronous motor, then means must be provided to assure that the moving parts of the linear synchronous motor, which are mounted on the railway car, be maintained in the same plane as the stationary motor parts, regardless of the angular deviation of the tracks, and therefore the railway cars, from this plane.

FIG. 3 shows one example of a railway switch 15 of this type, wherein the two tracks 16 leading off in different directions deviate symmetrically from the direction of the original track 17, with each of the new tracks 16 possessing one rail 18 which is superelevated above the other rail, thus providing a banked curve through the switch. The simplest configuration for the stationary motor parts 19 of the linear synchronous motor through the switch is the maintenance of the stationary motor parts 19 in a horizontal plane through the switch until a point 20 is reached where the stationary motor parts 19 can be separated into two distinct series 21, each of them following one of the divergent tracks 16 and then being brought into conformation with the plane of its particular track.

FIG. 4 shows a mechanism which can be employed to support the framework 2, including moving motor parts 1, of a railway car passing through a switch, and to control the angular orientation of the framework relative to its support 6 in such a way that the framework, and therefore the moving motor parts, remain coplanar with the horizontal stationary motor parts through a switch. Mounted on the support 6 and shown in FIG. 4 (but omitted from FIG. 1 for clarity) is a plate 22 attached to the support by means of an extension of the shaft 5. Mounted outboard of this pivot point, near the ends of the plate 22, are two detachable connectors 23, somewhat similar to those (13) used to attach the framework to its supports. These connectors 23 are designed to mate with sockets 24 in transverse members 4.

During normal travel along a railway, the connectors 23 are maintained in a retracted position and there is no rigid connection between the plates 22 and transverse members 4. Thus, the framework is free to rotate about the shafts 5 in response to changes in track geometry.

As a switch is approached, however, the connectors are energized, mating with the sockets in the transverse members and attaching the plates 22 firmly to the framework. At substantially the same time, the connectors 13 (FIG. 1) are retracted, freeing the connection between the framework and its supports 12. Support of the framework, and therefore the moving motor parts, is therefore provided by the plate 22 as the car passes through a switch.

One method of controlling the angular orientation of the framework through a switch is by means of a cam mechanism, as shown in FIG. 4. A pair of parallel extensions of the plate 22 serve as a cam follower in contact with an eccentric cam 25, which, in the preferred embodiment, is attached to the support 6 by means of a pivot 26. Cam 25 can be rotated in a controlled manner by means of a servomotor (not shown) or other means. As it rotates, it causes the plate 22 to rotate about the shaft 5. Since the connectors 23 are activated during switching operations, the framework also rotates about the shaft.

The pattern of rotation followed by the plate and framework is determined by the detailed geometry of the cam 25 and that portion of the plate 22 which acts as a cam follower. Design of these components and operation of the angular control mechanism can be greatly simplified if the design of the track through a switch follows certain restraints. First of all, if the two diverging tracks at a switch are made symmetrical about the incoming track, the framework can be made to pivot symmetrically in either direction, depending on the direction taken by the railway car at the switch, simply by applying the proper direction of rotation to a symmetrical cam 25. The design of the control system can be further simplified if the change in angular orientation of the framework as it enters a switch is similar to but opposite to the change in angular orientation of the framework as it exits from the switch. This can be accomplished by applying the same kind of linear symmetry to the tracks entering and exiting from the switch, and also to the orientation of the stationary motor parts 19 on both sides of the switch.

The width of the air gap between the moving motor parts and stationary motor parts depends not only on control of the vertical spacing between the moving motor parts and wheels, but also on control of the vertical spacing between the stationary motor parts and rails. Therefore, the enhanced efficiency of the linear synchronous motor as a whole can be achieved only if the vertical spacing between the stationary motor parts and rails is also carefully controlled.

In a railway system utilizing an overhead linear synchronous motor, but otherwise employing conventional construction methods and materials, it is quite difficult to maintain the vertical spacing between the rails and the stationary motor parts within the close dimensional tolerances demanded by maximized efficiency of the motor. Problems arise from three different sources: the difficulty of controlling the dimensions of all the various support components which lie between the rails and the moving motor parts; the maintenance of dimensional stability in these various components, which could include structures made of soil, wood, concrete, steel, or other materials; and the differences in thermal expansion coefficients of the various materials which make up the structural components. Therefore, it is of extreme importance that the connection between the rails and the stationary motor parts be as direct as possible, and also that the connection be made up of materials with similar thermal expansion characteristics.

Figure 5:
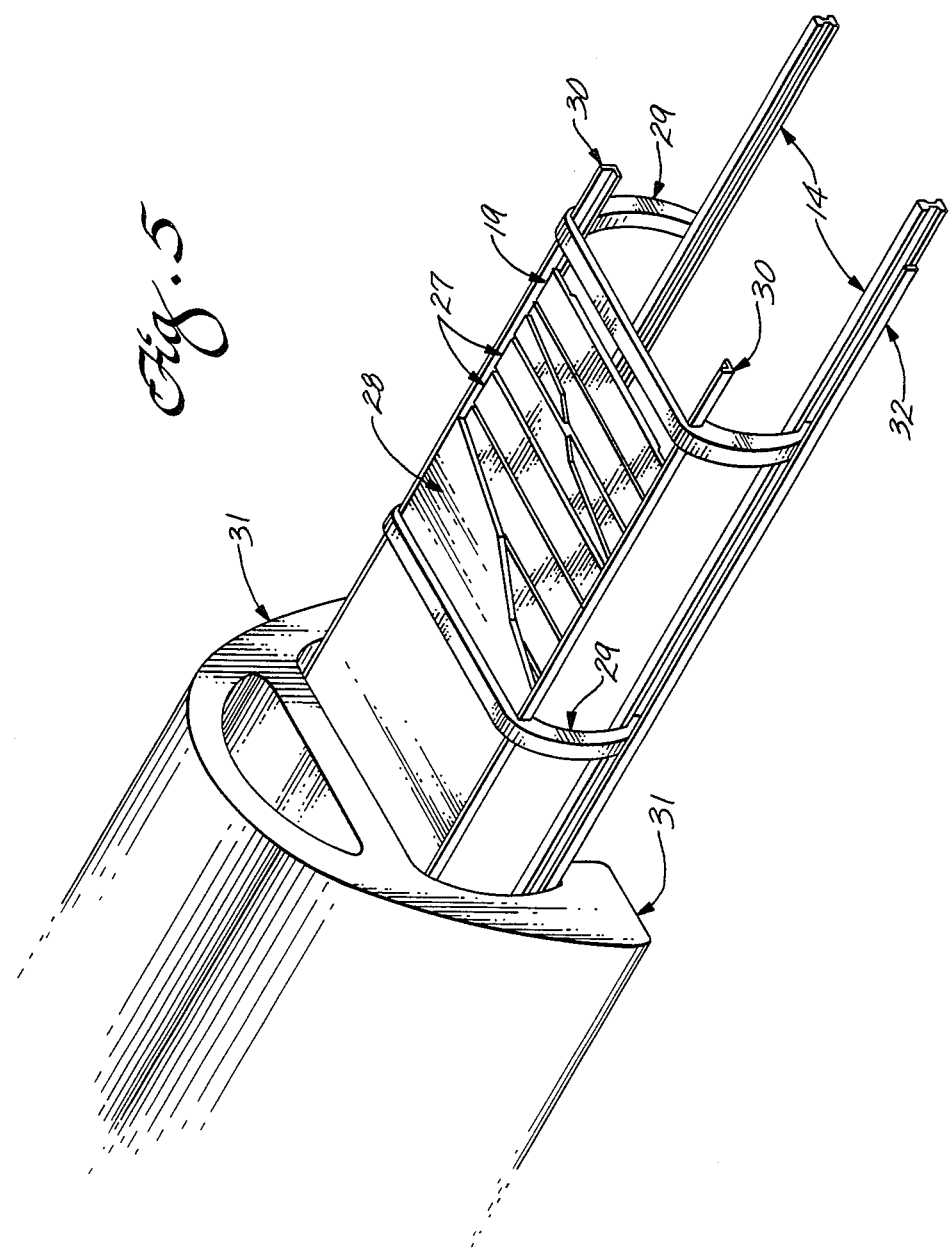
FIG. 5 is an isometric view of the connection between the stationary motor parts of a linear synchronous motor and the rails of a railway system.

One technique for doing this is shown in FIG. 5. In this view, stationary motor parts 19 are shown as they are most likely to appear in a linear synchronous motor, as soft iron focusing shoes attached to magnets 27. In the preferred embodiment, these magnets are permanent ceramic magnets of thin cross-section, and are attached to the track structure by means of a continuous back iron 28, which is also made of soft iron and which serves to complete the magnetic circuit between adjacent magnets.

Ribs 29, spaced at appropriate intervals, are connected directly to the vehicle supporting rails 14 and to the overhead stationary portion of the linear synchronous motor. If the ribs are spaced closely enough, the back iron will have sufficient strength to act as a structural member supporting the other components of the linear synchronous motor, magnets 27 and focusing shoes 19. If a wider spacing is selected, an additional support member, beam 30, can be utilized; such a beam is supported by the ribs 29, and in turn supports the focusing shoes 19, either directly or through the back iron and magnets. Since the rails and focusing shoes are thus connected in a substantially direct manner by the ribs, the vertical distance between them can be maintained within close tolerances.

If the rails and ribs are both made of steel, their thermal expansion coefficients, as well as that of the back iron, would be quite similar. In the same manner, with the use of steel for wheels, trucks, and frameworks, and moving motor parts made of soft iron, then the thermal expansion coefficients of all the moving components riding between rails and focusing shoes are of a substantially similar magnitude as well. Thus the air gap between the moving motor parts and stationary motor parts (focusing shoes) can be easily maintained at a small and substantially constant value over a wide range of ambient temperatures.

The structure consisting of rails, ribs, and back iron can also function in another manner which further optimizes operation of the railway system. If the basic support structure 31, supporting both the tracks and the railway cars riding upon the tracks, are to be made of concrete or some other material besides steel, this support structure may be equipped with expansion joints as needed, while both rails and back iron can be fabricated into continuous members through suitable welding techniques. The rails are then free to slide in a longitudinal direction relative to the support structure 31, perhaps on an intervening discontinuous member 32, made of a low-friction material and attached to individual sections of the support structure. In this way, support structures made of concrete or some other material which demands the use of expansion joints may be utilized in conjunction with a continuous rail-motor structure, with the elasticity of the steel and iron longitudinal members of the rail-motor structure being capable of withstanding longitudinal forces induced by temperature changes. Thus, the material properties of both mating structures could be utilized to fullest advantage.

What is claimed is:

1. Means for maintaining a substantially constant spatial relationship between moving magnets of a linear synchronous motor which is mounted on a railway car and serves to propel said car, and wheels which are mounted on said railway car and serve to support said car on rails of a railway system, in such a way that the moving magnets consistently follow the geometry of the rails upon which the wheels ride, said means comprising:

movable linkages connecting the moving magnets together in such a way that the linkages support the magnets, and in such a way that an operating surface of each magnet which faces mating operating surface of stationary magnets of the linear synchronous motor follows the motion of the linkages relative to the railway car; and means for connecting the linkages to wheel trucks of the railway car in such a way that the linkages, and consequently the magnets, follow the motion of the wheel trucks relative to the railway car, even at points of changing curvature of the rails.

2. The means of claim 1 wherein the wheels on each side of a wheel truck are mounted on a yoke attached to the truck in a manner which permits the yoke to rotate about an axis transverse to the direction of travel of the railway car, wherein the moving magnets are connected to the linkages by flexible means, and wherein the linkages are connected to the yokes.

3. The means of claim 1 wherein the linkages are connected to the wheel trucks by detachable means.

4. The means of claim 3 further comprising means for rotating the linkages, when detached from the wheel trucks, about an axis parallel to the direction of travel of the railway car.

5. The means of claim 4 wherein the means for rotating the linkages comprises:

auxiliary support for the linkages, rotatably connected to the railway car; and means for rotating the linkages about the auxiliary support in a controlled manner.

6. The means of claim 5 wherein the rotating means comprises a cam mechanism which can be rotated about its axis in either direction, with the rotation in one direction causing the linkages to rotate in one direction, and rotation in the opposite direction causing the linkages to rotate in the opposite direction.

7. Means for supporting moving magnets of a linear synchronous motor on a railway car a consistent distance from rails upon which wheels of the railway car ride, said means comprising:

a wheel truck and wheels on the railway car for riding on railroad rails;

a plurality of moving magnets on the railway car extending transversely to the length of the rails;

a framework for supporting the moving magnets in such a way that a working surface of each moving magnet follows the motion of the framework; and movable linkages connecting the framework and the truck for moving the framework in response to motion of the wheel trucks.

8. The means of claim 7 comprising:

a yoke on the framework; and means for mounting the yoke on the truck for rotating the yoke about an axis transverse to the truck.

9. The means of claim 8 comprising flexible connections between the yoke and the moving magnets.

10. The means of claim 9 comprising detachable means for connecting the flexible connections to the wheel trucks.

11. The means of claim 10 further comprising means for rotating the moving magnets, when detached from the wheel trucks, about the longitudinal axis of the railway car.

12. The means of claim 11 wherein the means for rotating the motor parts comprises:

auxiliary support for the moving magnets, rotatably connected to the railway car; and means for rotating the moving magnets about the auxiliary support in a controlled manner.

13. The means of claim 12 wherein the means for rotating comprises an eccentric cam mechanism which can be rotated about its axis in either direction, with the rotation in one direction causing the moving magnets to rotate in one direction, and rotation in an opposite direction causing the moving magnets to rotate in said opposite direction.

* * * * *